US012446580B2

(12) United States Patent
Chou et al.

(10) Patent No.: US 12,446,580 B2
(45) Date of Patent: Oct. 21, 2025

(54) LIQUID FORMULATION OF BIPHENYL-CONTAINING COMPOUND AND APPLICATION THEREOF

(71) Applicants: Shenyang Sinochem Agrochemicals R&D Co., Ltd., Liaoning (CN); JIANGSU YANGNONG CHEMICAL CO., LTD., Jiangsu (CN)

(72) Inventors: Jingyu Chou, Liaoning (CN); Lu Yu, Liaoning (CN); Yuquan Song, Liaoning (CN); Hongfei Wu, Liaoning (CN); Haibo Yu, Liaoning (CN)

(73) Assignees: SHENYANG SINOCHEM AGROCHEMICALS R&D CO., LTD., Liaoning (CN); JIANGSU YANGNONG CHEMICAL CO., LTD., Jiangsu (CN)

( * ) Notice: Subject to any disclaimer, the term of this patent is extended or adjusted under 35 U.S.C. 154(b) by 795 days.

(21) Appl. No.: 17/187,877

(22) Filed: Feb. 28, 2021

(65) Prior Publication Data

US 2021/0176988 A1 Jun. 17, 2021

Related U.S. Application Data

(63) Continuation-in-part of application No. PCT/CN2019/092162, filed on Jun. 21, 2019.

(30) Foreign Application Priority Data

Aug. 30, 2018 (CN) .......................... 201811004127.5

(51) Int. Cl.
*A01N 41/10* (2006.01)
*A01N 25/04* (2006.01)
*A01N 25/22* (2006.01)
*A01N 31/08* (2006.01)

(52) U.S. Cl.
CPC ............. *A01N 41/10* (2013.01); *A01N 25/04* (2013.01); *A01N 25/22* (2013.01); *A01N 31/08* (2013.01)

(58) Field of Classification Search
CPC ........ A01N 25/04; A01N 41/10; A01N 25/22; A01N 31/08; A01N 31/16; A01P 7/02
See application file for complete search history.

(56) References Cited

U.S. PATENT DOCUMENTS 9,856,212 B1 * 1/2018 Zhang .................... A01N 31/08

FOREIGN PATENT DOCUMENTS

| CN | 105541682 A | 5/2016 | |
|---|---|---|---|
| JP | 2009023910 A | 2/2009 | |
| JP | 4621867 B2 * | 1/2011 | |
| TW | 201321347 A | 6/2013 | |
| WO | WO-2015125824 A1 * | 8/2015 | ............. A01N 43/40 |
| WO | WO-2017067500 A1 * | 4/2017 | ............. A01N 31/08 |

OTHER PUBLICATIONS

J. Qin et.al. 293, J Ethnopharmacol, 115257, (2022) (Year: 2022).*
LG Zhang et al., Chinese Traditional and Herbal Drugs ; (24): 3328-3333, 2013. (Year: 2013).*
A. Knowles, 28 Environmentalist, 34-44 (2008) (Year: 2008).*

* cited by examiner

*Primary Examiner* — James H Alstrum-Acevedo
*Assistant Examiner* — Chantal Adlam
(74) *Attorney, Agent, or Firm* — NKL Law; Allen Xue

(57) ABSTRACT

The present invention belongs to the field of acaricides, and relates to a liquid formulation of a biphenyl-containing compound and an application thereof. A liquid formulation of a biphenyl-containing compound takes compound A as an active component and comprises at least one carrier and at least one auxiliary. The weight percentage of the active component in the liquid formulation is 0.1%-99%. The liquid formulation of the present invention can control the particle size of the liquid formulation through a good auxiliary system, and has the characteristics of good dispersibility, high suspension rate, good biological activity, low dosage, low cost, resistance to rain washing, low residue and low toxicity to people and animals.

8 Claims, No Drawings

LIQUID FORMULATION OF BIPHENYL-CONTAINING COMPOUND AND APPLICATION THEREOF

TECHNICAL FIELD

The present invention belongs to the field of acaricides, and relates to a liquid formulation of a biphenyl-containing compound and an application thereof.

BACKGROUND

The biphenyl compound (hereinafter referred to as compound A) disclosed in Chinese invention patent CN 105541682 A has excellent mite control effect and broad market application prospects. The structure of the compound A is as follows:

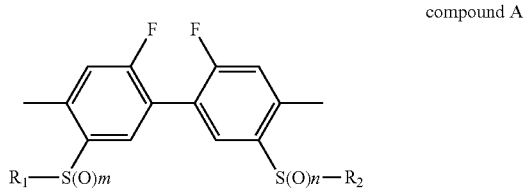

compound A

As mentioned in the above invention patent CN 105541682 A, the compound A may be used in the form of dry powder, wettable powder, emulsifiable concentrate, microemulsion, paste, granule, solution, suspension concentrate, etc., but the use form of the compound A recorded in the patent is prepared in a known mode, for example by diluting or dissolving the active substance with a solvent medium and/or a solid diluent, optionally in the presence of surfactants. However, the selection of the use type of the compound A as known in the field depends on specific application. Meanwhile, it was found in the actual development process of a pesticide formulation product that the form of formulate mentioned in the above patent is universal applicable formulation, and cannot control the particle size of the product. Moreover, after massive data verification, the universal applicable formulation realizes obvious increase of the particle size, and thus obviously influences the biological activity, or even makes the product unusable. The product has problems of creaming and flocculation and is directly taken as an unqualified product. The compound A has a melting point of 50-60° C., which is a typical disadvantage for the liquid formulation. It is well known in the industry that the preparation conditions of the suspension concentrates are as follows: the melting point is above 60° C., the solubility in water is less than 200 mg/L, and the active ingredients is stable in an aqueous solution. It has been reported that the melting points of some compounds are about 60° C., such as pendimethalin with a melting point of 54-58° C. and myclobutanil with a melting point of 63-68° C. Although the preparation conditions of the suspension concentrate can be satisfied to a certain extent, due to the low melting point, physical properties may be changed in an accelerated heat storage test in the national standard of pesticide formulations, such as creaming, flocculation, crystallization and significant increase of particle size. After the suspension concentrate is placed at normal temperature, the particle size is further increased. In this case, pesticide liquid formulation products, including but not limited to suspension concentrate, emulsion (oil in water), micro-emulsions and solutions may be unqualified. In the practical application process, due to the increase of the particle size, the biological activity is obviously influenced, or even the product is unusable. Therefore, it is of great significance to develop a liquid pesticide formulation which is suitable for the active component and has qualified properties and no obvious increase of the particle size.

SUMMARY

The purpose of the present invention is to provide a liquid formulation of a biphenyl-containing compound and an application thereof.

To achieve the above purpose, the present invention adopts the following technical solution:

A liquid formulation of a biphenyl-containing compound takes compound A as an active component and comprises at least one carrier and at least one auxiliary. The weight percentage of the active component in the liquid formulation is 0.1%-99%, wherein the structural formula of the compound A is as follows:

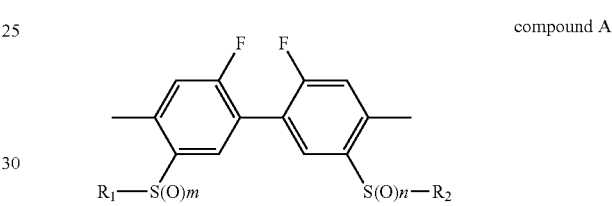

compound A

In the formula, $R_1$ and $R_2$ are independently selected from hydrogen, $C_1$-$C_8$ alkyl, halogenated $C_1$-$C_8$ alkyl, $C_2$-$C_8$ alkenyl, halogenated $C_2$-$C_8$ alkenyl, $C_2$-$C_8$ alkynyl, halogenated $C_2$-$C_8$ alkynyl, cyano $C_1$-$C_8$ alkyl or cyano halogenated $C_1$-$C_8$ alkyl; m and n are independently selected from 0, 1 or 2.

The liquid formulation of an acaricide is soluble concentrate, oil miscible liquid, spreading oil, dispersible concentrate, emulsion (oil in water), emulsion (water in oil), emulsifiable concentrate, micro-emulsion, suspension concentrate, capsule suspension, oil miscible flowable concentrate, oil-based suspension concentrate, or ultra low volume liquid.

The formulation of the acaricide is the emulsion (oil in water), suspension concentrate, oil-based suspension concentrate, emulsifiable concentrate or micro-emulsion.

The auxiliary in the liquid formulation also comprises a stabilizer, wherein the stabilizer is liquiritin.

The emulsion (oil in water) comprises by mass percentage: 2%-60% of compound A, 2%-20% of solvent, 1%-30% of wetting dispersant, 0%-3% of stabilizer and the balance of deionized water.

The suspension concentrate comprises by mass percentage: 2%-60% of compound A, 5%-30% of wetting dispersant, 0%-3% of stabilizer and the balance of deionized water.

The oil-based suspension concentrate comprises by mass percentage: 2%-60% of compound A, 5%-30% of wetting dispersant, 0%-3% of stabilizer and the balance of dispersion medium oil.

The emulsifiable concentrate comprises by mass percentage: 2%-60% of compound A, 5%-30% of wetting dispersant, 0%-3% of stabilizer and the balance of solvent.

The micro-emulsion comprises by mass percentage: 2%-60% of compound A, 2%-15% of solvent, 1%-30% of wetting dispersant, 0%-3% of stabilizer and the balance of deionized water.

Preferably, the emulsion (oil in water) comprises by mass percentage: 2%-60% of compound A, 2-15% of solvent, 1%-30% of wetting dispersant, 0.01%-1.5% of stabilizer and the balance of deionized water.

The suspension concentrate comprises by mass percentage: 2%-60% of compound A, 5%-30% of wetting dispersant, 0.01%-1.5% of stabilizer and the balance of deionized water.

The oil-based suspension concentrate comprises by mass percentage: 2%-60% of compound A, 5%-30% of wetting dispersant, 0.01%-1.5% of stabilizer and the balance of dispersion medium oil.

The emulsifiable concentrate comprises by mass percentage: 2%-60% of compound A, 5%-30% of wetting dispersant, 0.01%-1.5% of stabilizer and the balance of solvent.

The micro-emulsion comprises by mass percentage: 2%-60% of compound A, 2%-15% of solvent, 1%-30% of wetting dispersant, 0.01%-1.5% of stabilizer and the balance of deionized water.

The wetting dispersant of the suspension concentrate is one or more of polyethylene oxide polyvinyl ether, lignin sulfonate, polymer carboxylate, naphthalene sulfonate, block copolymer, phosphate ester, alkyl vinyl aryl phenyl ether, alkylphenol polyoxyethylene ether formaldehyde condensate sulfonate or polymer biparental anionic nonionic compound surfactant.

The wetting dispersant in the oil-based suspension concentrate, emulsion (oil in water), emulsifiable concentrate or micro-emulsion is one or more of sulfonate, carboxylate, phosphate ester salt, fatty alcohol polyoxyethylene ether, alkylphenol ethoxylate, fatty amine polyoxyethylene ether, fatty acid polyoxyethylene ether, acid alcohol ester and polyoxyethylene ether thereof, alkyl polyglycol ether, alkyl phenyl polyglycol ether, fatty amide and polyoxyethylene ether thereof, alkanolamide and polyoxyethylene ether thereof, block copolymer, sodium alkyl naphthalene sulfonate fatty alcohol polyoxyethylene ether, sorbitan fatty acid ester polyoxyethylene ether.

Preferably, the wetting dispersant in the suspension concentrate is polyethylene oxide polyvinyl ether, polymer carboxylate and/or phosphate ester surfactant.

The wetting dispersant in the oil-based suspension concentrate, emulsion (oil in water), emulsifiable concentrate or micro-emulsion is fatty alcohol polyoxyethylene ether and/or block copolymer surfactant.

The wetting dispersant is polyethylene oxide polyvinyl ether such as TENSIOFIX 35600, polymer carboxylate and/or phosphate ester such as Atlox 4913.

The auxiliary in the above formulation also comprises one or more of anionic surfactant, nonionic surfactant, anionic and nonionic compound surfactant and polymer surfactant, and a dispersion medium or carrier, and can also, but do not have to, comprise a thickener, a defoamer, a preservative and a pH regulator.

The dispersion medium comprises oil, an organic solvent and water.

The thickener can be one or more of xanthan gum, gelatin, acacia gum, polyvinyl acetate, polyvinylpyrrolidone, magnesium aluminum silicate, polyvinyl alcohol, polyethylene glycol, phenolic resin, shellac, hydroxymethyl cellulose, hydroxyethyl cellulose, hydroxypropyl cellulose, methylcellulose and sodium alginate, and can improve the physical layering of the formulation to a certain extent.

The defoamer can be one or more of defoamer SAG1522, silicone, $C_{8-10}$ fatty alcohol, phosphate ester, $C_{10-20}$ saturated fatty acid (such as capric acid) and amide or others.

The preservative can be one or more of sodium benzoate, Kathon (2-methyl-4-isothiazolin-3-one and (B) 5-chloro-2-methyl-4-isothiazolin-3-one), potassium sorbate, sodium dehydroacetate or others.

In the above formulation, when water is used as a solvent or diluent, the organic solvent can also be used as an auxiliary solvent or antifreeze additive.

The organic solvent may be selected from, but not limited to, aromatic hydrocarbon, chlorinated aromatic hydrocarbon, aliphatic hydrocarbon, chlorinated aliphatic hydrocarbon, vegetable oil and methyl cellosolve.

The above provided formulation has good physical and chemical application performance. The active component A has excellent dispersibility in the carrier. Meanwhile, the active component A has uniform particle size, strong dispersion stability and good medicinal effect under the action of the selected stabilizer liquiritin, the wetting dispersant and other matching auxiliaries. In the process of using the formulation diluted with water, the formulation has strong adhesion and penetrability and strong transmission effect of the bioactivity.

An application of the liquid formulation of the biphenyl-containing compound is provided, which is an application of the liquid formulation as a plant acaricide.

In application of the liquid formulation, the particle size of the liquid formulation is controlled to ensure an excellent control effect; and the liquid formulation is safe for crops, and has well control effects on tetranychidae (*Tetranychus urticae* koch, *Tetranychus cinnabarinus, Panonychus ulmi* and *Panonychus citri*), eriophyidae and tarsonemidae.

The liquid formulation is applied to insect pests to be controlled or growth media thereof at dose of 10-5000 grams of active components per hectare.

The liquid formulation can be diluted or directly mixed with water, and then sprayed by a user before use, or can be used directly.

The present invention has the following advantages:

The present invention uses compound A with a low melting point as the active component to prepare the liquid formulation. The obtained liquid formulation solves the problems that the active component particles are dissolved when the existing formulation is at the accelerated heat storage condition of 54±2° C. specified by the national standard, the particle size is intensively increased.

The slight increase of particles will result in the obvious increase of the particle size D98, and the significant increase of particles will result in sample creaming, causing that the formulation product cannot be used. Furthermore, in the present invention, the liquiritin as the stabilizer is added to the liquid formulation under the condition of selecting and matching an appropriate auxiliary system, and a specific addition amount is provided, which can inhibit the increase of the particle size of the product. The interaction between the liquiritin and the structure of compound A has the effect of inhibiting the increase of the particle size in the liquid formulation. Through the addition of the liquiritin, after the particle size is controlled, the product stability is significantly improved, which ensures the excellent acaricidal activity; and the liquid formulation is safe for the crops.

The liquid formulation prepared by the specific auxiliary in the present invention improves the wetting, spreading, dispersion, retention and penetration performance of the active component on the plant leaves, thereby increasing the retention amount of pesticide active components on plant surfaces, prolonging the retention time and improving the penetration ability of plant epidermis, so as to improve the biological activity of pesticides and reduce the use dosage. The liquid formulation of the present invention can control the particle size of the liquid formulation through a good auxiliary system, and has the characteristics of good dispersibility, high suspension rate, good biological activity, low dosage, low cost, resistance to rain washing, low residue and low toxicity to people and animals.

DETAILED DESCRIPTION

The following specific embodiments are used to further illustrate the present invention in detail, but the present invention is not limited to these examples. The methods well known to those skilled in the art are included in the scope of the present invention.

The percentages and parts in the following formulas are based on weight. The active component compound A is prepared in accordance with the records of the prior art (content of 93%-99%) and added in 100% dosage. The proportion of each component is a weight percentage, and other raw materials are all commercially available products. The structure of the used compound A is shown in Table 1.

compound A

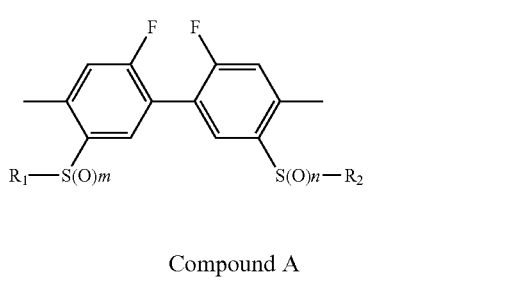

Compound A

TABLE 1

| Structure of compound A | | | | |
|---|---|---|---|---|
| Composition | $R_1$ | $R_2$ | m | n |
| A-1 | $CH_2CF_3$ | $CH_2CF_3$ | 0 | 1 |
| A-2 | $CH_2CF_3$ | $CH_2CF_3$ | 1 | 1 |
| A-3 | $CH_2CF_3$ | $CH_2CF_3$ | 1 | 2 |
| A-4 | $CH_2CF_3$ | $CH_2CF_3$ | 0 | 0 |

Formula Embodiments of Formulation

Embodiment 1. Preparation of 5% Compound A-1 Suspension Concentrate

The formula comprises 5% of compound A-1, 5% of D 425, 3% of NNO, 0.8% of magnesium aluminum silicate, 0.1% of xanthan gum and the balance of water to 100%, so as to obtain a 5% compound A-1 suspension concentrate with good dispersibility.

Embodiment 2-1. Preparation of 10% Compound A-2-1 Suspension Concentrate

The formula comprises 10% of compound A-2, 5% of SK-24, 3% of TENSIOFIX DB08, 0.6% of magnesium aluminum silicate, 0.1% of xanthan gum and the balance of water to 100%, so as to obtain a 10% compound A-2-1 suspension concentrate with good dispersibility.

Embodiment 2-2. Preparation of 10% Compound A-2-2 Suspension Concentrate

The formula comprises 10% of compound A-2, 5% of SK-24, 3% of TENSIOFIX DB08, 0.05% of liquiritin, 0.6% of magnesium aluminum silicate, 0.1% of xanthan gum and the balance of water to 100%, so as to obtain a 10% compound A-2-2 suspension concentrate with good dispersibility.

Embodiment 3. Preparation of 15% Compound A-3 Suspension Concentrate

The formula comprises 15% of compound A-3, 5% of DB08, 3% of TENSIOFIX DB08, 1% of magnesium aluminum silicate, 0.1% of xanthan gum and the balance of water to 100%, so as to obtain a 15% compound A-3 suspension concentrate with good dispersibility.

Embodiment 4-1. Preparation of 15% Compound A-4-1 Suspension Concentrate

The formula comprises 15% of compound A-4, 5% of YUS-FS3000, 3% of GYD07, 3% of Atlox 4913, 1% of magnesium aluminum silicate, 0.1% of xanthan gum and the balance of water to 100%, so as to obtain a 15% compound A-4-1 suspension concentrate with good dispersibility.

Embodiment 4-2. Preparation of 15% Compound A-4-2 Suspension Concentrate

The formula comprises 15% of compound A-4, 5% of YUS-FS3000, 3% of GYD07, 3% of Atlox 4913, 0.05% of liquiritin, 1% of magnesium aluminum silicate, 0.1% of xanthan gum and the balance of water to 100%, so as to obtain a 15% compound A-4-2 suspension concentrate with good dispersibility.

Reference Example 1: Preparation of 15% Compound A-4 Suspension Concentrate

The formula comprises 15% of compound A-4, 5% of AEO-3, 3% of NNO, 1% of magnesium aluminum silicate, 0.1% of xanthan gum and the balance of water to 100%, so as to obtain a 15% compound A-4 suspension concentrate with good dispersibility.

Embodiment 5. Preparation of 30% Compound A-4 Suspension Concentrate

The formula comprises 15% of compound A-4, 4% of GYD07, 3% of SP2728, 1% of magnesium aluminum silicate, 0.2% of xanthan gum and the balance of water to 100%, so as to obtain a 30% compound A-4 suspension concentrate with good dispersibility.

Embodiment 6-1. Preparation of 10% Compound A-4-1 Oil-Based Suspension Concentrate According to the requirements of the formula, 10% of compound A-4, 5% of dispersant NP-10, 4% of pesticide emulsifier 1602, 2% of white carbon black and the balance of methyl oleate to 100% were successively added to a mixing tank for mixing. The mixture was subjected to coarse grinding through high shear and homogenized, and then transferred into a sand mill for fine grinding to obtain a 10% compound A-4-1 oil-based suspension concentrate.

Embodiment 6-2. Preparation of 10% Compound A-4-2 Oil-Based Suspension Concentrate According to the requirements of the formula, 10% of compound A-4, 5% of dispersant NP-10, 4% of pesticide emulsifier 1602, 2% of white carbon black, 0.5% of liquiritin and the balance of methyl oleate to 100% were successively added to a mixing tank for mixing. The mixture was subjected to coarse grinding through high shear and homogenized, and then transferred into the sand mill for fine grinding to obtain a 10% compound A-4-2 oil-based suspension concentrate.

Embodiment 7. Preparation of 15% Compound A-4 Oil-Based Suspension Concentrate According to the requirements of the formula, 15% of compound A-4, 5% of dispersant NP-10, 4% of pesticide emulsifier 1601, 2% of white carbon black and the balance of methyl oleate to 100% were successively added to a mixing tank for mixing. The mixture was subjected to coarse grinding through high shear and homogenized, and then transferred into a sand mill for fine grinding to obtain a 15% compound A-4 oil-based suspension concentrate.

Embodiment 8. Preparation of 5% Compound A-1 Emulsion (Oil in Water)

According to the requirements of the formula, 5% of compound A-1, 5% of pesticide emulsifier 0201B, 2% of pesticide emulsifier 600, 5% of dimethyl formamide and the balance of water to 100% were added into a mixing kettle, stirred and mixed evenly, and heated and dissolved with a hot water bath if necessary to obtain a 5% compound A-1 emulsion (oil in water).

Embodiment 9. Preparation of 10% Compound A-2 Emulsion (Oil in Water)

According to the requirements of the formula, 5% of compound A-2, 5% of pesticide emulsifier 1602, 2% of pesticide emulsifier 600, 5% of solvent oil 200 and the balance of water to 100% were added into a mixing kettle, stirred and mixed evenly, and heated and dissolved with a hot water bath if necessary to obtain a 10% compound A-2 emulsion (oil in water).

Embodiment 10. Preparation of 10% Compound A-3 Emulsion (Oil in Water)

According to the requirements of the formula, 10% of compound A-3, 5% of YUS-110, 6% of YUS-D935, 10% of cyclohexanone and the balance of water to 100% were added into the mixing kettle, stirred and mixed evenly, and heated and dissolved with a hot water bath if necessary to obtain a 10% compound A-3 emulsion (oil in water).

Embodiment 11-1. Preparation of 15% Compound A-4-1 Emulsion (Oil in Water)

According to the requirements of the formula, 15% of compound A-4, 4% of Atlox 4838B, 7% of YUS-110, 10% of solvent oil 150 and the balance of water to 100% were added into a mixing kettle, stirred and mixed evenly, and heated and dissolved with a hot water bath if necessary to obtain a 15% compound A-4-1 emulsion (oil in water).

Embodiment 11-2. Preparation of 15% Compound A-4-2 Emulsion (Oil in Water)

According to the requirements of the formula, 15% of compound A-4, 4% of Atlox 4838B, 7% of YUS-110, 1% of liquiritin, 10% of solvent oil 150 and the balance of water to 100% were added into a mixing kettle, stirred and mixed evenly, and heated and dissolved with a hot water bath if necessary to obtain a 15% compound A-4-2 emulsion (oil in water).

Embodiment 12-1. Preparation of 15% Compound A-4-3 Suspension Concentrate

The formula comprises 15% of compound A-4, 5% of $SPSC_3$, 5% of TENSIOFIX 35600, 5% of Atlox 4913, 1% of magnesium aluminum silicate, 0.1% of xanthan gum and the balance of water to 100%, so as to obtain a 15% compound A-4-3 suspension concentrate with good dispersibility.

Embodiment 12-2. Preparation of 15% Compound A-4-4 Suspension Concentrate

The formula comprises 15% of compound A-4, 3% of YUS-FS3000, 5% of TENSIOFIX 35600, 5% of Atlox 4913, 1% of magnesium aluminum silicate, 0.1% of xanthan gum and the balance of water to 100%, so as to obtain a 15% compound A-4-4 suspension concentrate with good dispersibility.

Embodiment 12-3. Preparation of 15% Compound A-4-5 Suspension Concentrate

The formula comprises 15% of compound A-4, 3% of YUS-FS3000, 5% of TENSIOFIX 35600, 5% of Atlox 4913, 0.05% of liquiritin, 1% of magnesium aluminum silicate, 0.1% of xanthan gum and the balance of water to 100%, so as to obtain a 15% compound A-4-5 suspension concentrate with good dispersibility.

Embodiment 13. Preparation of 15% Compound A-4 Paste

The formula comprises 15% of compound A-4, 5% of NNO, 10% of starch, 15% of water and the balance of calcium carbonate to 100%, so as to obtain 15% compound A-4 paste with good physical properties.

Embodiment 14. Preparation of 15% Compound A-4 Wettable Powder

The formula comprises 15% of compound A-4, 5% of calcium lignosulphonate, 3% of NNO, 5% of white carbon black and the balance of light calcium carbonate to 100%, so as to obtain 15% compound A-4 wettable powder with good physical properties.

The normal temperature particle sizes and the heat storage particle sizes at 45±2° C. and 54±2° C. of the liquid formulations obtained in the above embodiments were respectively measured. See Table 2 for details.

The data in Table 2 were measured by a laser particle analyzer, and the particle size D98 means that 98% of the sizes of the particles in the system are below the value. Therefore, the smaller the value of D98 is, the smaller the particle size of the system is. The smaller the change of the particle sizes from normal temperature to two storage conditions of 54±2° C. and 45±2° C. (refer to the standard: Manual on development and use of FAO and WHO specifications for pesticides) is, the more effective the control for the particle sizes is.

TABLE 2

Influence of Control for Particle Size (D98 μm)

| Embodiments | Normal temperature particle size D98 | 54° C. 14 d particle size D98 | 45° C. 42 d particle size D98 |
|---|---|---|---|
| Embodiment 1 | 9.88 | 49.88 | 35.21 |
| Embodiment 2-1 | 5.06 | 39.92 | 26.51 |
| Embodiment 2-2 | 5.11 | 7.51 | 5.54 |
| Embodiment 3 | 6.88 | 44.17 | 33.12 |
| Embodiment 4-1 | 3.96 | 21.99 | 14.81 |
| Embodiment 4-2 | 3.88 | 7.21 | 4.94 |
| Reference Example 1 | 14.07 | 86.44 | 52.52 |
| Embodiment 5 | 5.11 | 37.21 | 25.63 |
| Embodiment 6-1 | 11.11 | 71.11 | 48.88 |
| Embodiment 6-2 | 3.94 | 5.66 | 4.92 |
| Embodiment 7 | 4.78 | 27.98 | 15.34 |
| Embodiment 8 | 5.21 | 28.99 | 18.33 |
| Embodiment 9 | 4.92 | 30.01 | 19.97 |
| Embodiment 10 | 3.99 | 25.44 | 16.92 |
| Embodiment 11-1 | 3.21 | 22.19 | 17.66 |
| Embodiment 11-2 | 2.88 | 5.37 | 3.99 |
| Embodiment 12-1 | 3.88 | 20.09 | 13.71 |
| Embodiment 12-2 | 3.68 | 16.81 | 11.93 |
| Embodiment 12-3 | 3.22 | 6.99 | 4.21 |
| Embodiment 13 | 12.21 | 42.19 | 37.66 |
| Embodiment 14 | 18.66 | 49.89 | 38.09 |

It can be seen from Table 2 that for the suspension concentrates of embodiments 1-5 and 12-1 to 12-3, different auxiliary systems have certain influence on the particle sizes of the suspension concentrates prepared by compound A. The control for the particle size of the formulation is significantly improved under the specific auxiliary system. After the liquiritin is added to the formulation, as obviously shown in embodiment 2-2 in which the liquiritin is added, under two accelerated heat storage conditions, the suspension concentrates after the liquiritin is added significantly enhance and improve the control for the particle sizes. It can be seen that, compared with the prior art, the suspension concentrates after the liquiritin is added realizes the synergistic compatibility between the active component and the auxiliary system, and disperses the active component in the carrier more uniformly, and especially the addition of the liquiritin can significantly improve the control for the particle sizes of the product system. The biological activity of the formulation product prepared with the auxiliary system is more prominent.

For the oil-based suspension concentrates in embodiments 6 and 7, different auxiliary systems and dispersion media also have certain influences on the particle sizes of the oil-based suspension concentrates. The control for the particle sizes also requires a specific auxiliary system, and the addition of the liquiritin also significantly improves the control for the particle sizes. Compared with the prior art, the synergy between the active component and the auxiliary system is realized. The formulation product prepared with the auxiliary system has good dispersibility, stable performance and better control for the increase of the particle sizes. In addition, the diluent has large deposition amount on a target, strong adhesion, strong penetrability and prominent biological activity, thereby increasing the utilization rate of the active component and further achieving the purpose of reducing the number of medications and dosages. Moreover, the diluent has little pollution to the environment, and is safe for people, livestock, birds and beneficial organisms, and more conducive to protecting the ecological balance.

For the emulsion (oil in water) of embodiments 8-11, different auxiliary systems have certain influence on the control for the particle sizes, and the addition of the liquiritin can well control the increase of the particle sizes under two storage conditions.

For the wettable powders of embodiment 13 and embodiment 14, the particle size of the sample at normal temperature is relatively large. It can be indicated that conventional formulation which can be prepared by certain structural substances mentioned in the prior art have certain technical defects. Namely, to achieve an approximate particle size and even good biological activity, the assistance of the formulation technology is required.

To sum up, it can be seen that the particle size of the liquid formulation product obtained in the above embodiments is controlled, which plays a vital role in the physical properties of the product, the long-term stability of the product, the biological activity of the product, and other aspects.

Meanwhile, after the liquiritin is specifically added, the liquiritin interacts with the structure of compound A, so as to effectively control the change of impurities or crystal forms of the structure of compound A under the change of the storage conditions, thereby controlling the increase of the particle sizes. The substance is added to the present invention, and unexpected results are obtained. The problem of control for the particle sizes of low-melting point compounds in the prior art is solved, thereby obtaining a pesticide formulation with excellent performance, small particle size and excellent bioactivity.

Embodiment of Biological Activity

To verify the influence on the biological activity after the control for the particle sizes, the following biological activity test was carried out. In the test, the biological activities of embodiment 4-1, embodiment 4-2, the reference example 1 and compound A on *Tetranychus cinnabarinus* were compared.

Embodiment 15 Biological Activity Test-1 of *Tetranychus cinnabarinus*

Test samples: 98% compound A-4, embodiment 4-1, embodiment 4-2 and reference example 1 formulations.

Test conditions: Insecticide laboratory, normal room temperature. In an insecticide observation room, temperature, humidity and illumination can be adjusted as required. The greenhouse is an all-weather solar greenhouse.

Preparation of the test solutions: an electronic analytical balance was used to accurately weigh the test samples; water was directly added to the formulation to prepare the required concentration of mother liquid; compound A-4 was first completely dissolved in a solvent, and then prepared into the required concentration of mother liquid by 0.1% Tween 80 water; and the mother liquid was diluted with water into a series of test solutions with a certain concentration gradient according to the test design.

Test method: The activities of different batches of test samples for *Tetranychus cinnabarinus* adults are measured by a potted seedling spray method. Firstly, the *Tetranychus cinnabarinus* adults of the same size were connected to bean seedling leaves in the first pair of true leaf flattening stage, and the base number was counted after the *Tetranychus cinnabarinus* adults were stabilized. Then, the *Tetranychus cinnabarinus* adults were sprayed evenly according to the test design from a low dose to a high dose for 2 mL per adult; and blank control was set.

Investigation method: the processed test materials were placed in the observation room under certain conditions; the number of dead and alive adults of the *Tetranychus cinnabarinus* were regularly investigated; the mortality rate was calculate; and DPS software was used to calculate the virulence regression equation, $LC_{50}$ value and 95% confidence limit.

TABLE 3

Determination of Indoor Toxicity of Tetranychus Cinnabarinus Adult by Samples

| Samples | Virulence regression equation | $LC_{50}$ value (mg/L) | 95% confidence interval (mg/L) |
|---|---|---|---|
| Embodiment 4-1 | Y = 6.0986 + 4.4591X | 0.5670 | 0.4755-0.6459 |
| Embodiment 4-2 | Y = 5.5600 + 1.9199X | 0.5109 | 0.4325-0.6265 |
| Reference Example 1 | Y = 5.7054 + 4.1634X | 0.6770 | 0.5904-0.7553 |
| Compound A-4 | Y = 5.8127 + 3.5993X | 0.5946 | 0.5137-0.6771 |

It can be seen from Table 3 that embodiment 4-2 has the lowest $LC_{50}$ value and the best activity; in Table 2, the particle size of embodiment 4-2 is smaller and the increase of the particle size is better controlled. The biological activity of embodiment 4-1 is slightly worse than that of embodiment 4-2, but significantly better than that of compound A-4. Thus, it can be judged that the biological activity of the suspension concentrates is improved after the addition of the liquiritin, and the $LC_{50}$ value can be further reduced. It can be seen from the $LC_{50}$ of the reference example 1 that on the basis that the auxiliary system is unsuitable, as shown in Table 2, the value of the particle size is large and the increase amplitude of the particle size is also large. Even if a formulation is prepared, a good biological activity cannot be obtained because the control for the particle size is not ideal. The $LC_{50}$ value is even higher than that of the original pesticide Thus, it can be judged that the liquid formulation product of compound A, which may be the suspension concentrate, the emulsion (oil in water) and the oil-based suspension concentrate, can ensure the biological activity and avoid the disadvantages of conventional formulation mentioned in the reference document patent CN 105541682 A only when the synergistic effect of the auxiliary system is good. Moreover, the control for the particle sizes plays an important role in the biological activity of the liquid formulation.

Embodiment 16 Biological Activity Test-2 of *Tetranychus cinnabarinus*

Test samples: 98% compound A-4, embodiment 12-1, embodiment 12-2, embodiment 12-3, embodiment 13 and embodiment 14.

Test conditions: same as embodiment 15. (Insecticide laboratory, normal room temperature. In an insecticide observation room, temperature, humidity and illumination can be adjusted as required. The greenhouse is an all-weather solar greenhouse.)

Preparation of the test solutions: same as embodiment 15. (An electronic analytical balance was used to accurately weigh the test samples; water was directly added to the formulation to prepare the required concentration of mother liquid; compound A-4 was first completely dissolved in a solvent, and then prepared into the required concentration of mother liquid by 0.1% Tween 80 water; and the mother liquid was diluted with water into a series of test solutions with a certain concentration gradient according to the test design.)

Test method: same as embodiment 15. (The activities of different batches of test samples for *Tetranychus cinnabarinus* adults are measured by a potted seedling spray method. Firstly, the *Tetranychus cinnabarinus* adults of the same size were connected to bean seedling leaves in the first pair of true leaf flattening stage, and the base number was counted after the *Tetranychus cinnabarinus* adults were stabilized. Then, the *Tetranychus cinnabarinus* adults were sprayed evenly according to the test design from a low dose to a high dose for 2 mL per adult; and blank control was set.)

Investigation method: the processed test materials were placed in the observation room under certain conditions; the number of dead and alive adults of the *Tetranychus cinnabarinus* were regularly investigated; the mortality rate was calculate; and DPS software was used to calculate the virulence regression equation, $LC_{50}$ value and 95% confidence limit.

LC50 value will be different in different batches of bioactivity tests due to individual differences and growth stages of the target mites. Each test data comparison is only conducted between the test data of the same group in this batch.

TABLE 4

Determination of Indoor Toxicity of Tetranychus Cinnabarinus Adult by Samples

| Samples | Virulence regression equation | $LC_{50}$ value (mg/L) | 95% confidence interval (mg/L) |
|---|---|---|---|
| Embodiment 12-1 | 5.4244 + 3.2399x | 0.7396 | 0.5591-0.9783 |
| Embodiment 12-2 | 5.3258 + 2.4406x | 0.7354 | 0.5377-1.0056 |
| Embodiment 12-3 | 5.6340 + 2.5945x | 0.5697 | 0.3502-0.9266 |
| Embodiment 13 | 4.1609 + 3.1558x | 1.8446 | 1.6474-2.0654 |
| Embodiment 14 | 4.5592 + 1.6041x | 1.8827 | 1.7440-2.0323 |
| Compound A-4 | 5.2168 + 2.5181x | 0.8202 | 0.7646-0.8797 |

The purpose of the biological activity verification, which is the same as embodiment 15, is only to further confirm the technical solution of the present invention.

Three suspension concentrate samples were prepared according to a similar technical solution in embodiment 16. It can be seen from the obtained data that the suspension concentrate samples prepared by a good auxiliary system have excellent biological activity under controllable particle size, have $LC_{50}$ of 0.7396 mg/L, 0.7354 mg/L and 0.5697 mg/L respectively, significantly better than $LC_{50}$ 0.8202 of compound A-4. Embodiment 12-3 with the liquiritin has a more prominent effect than others.

It can be seen from embodiment 13 and embodiment 14 that a pesticide formulation with good biological activity may not be prepared according to the well-known technical solution in the industry. The biological activities of the embodiment 13 and embodiment 14 prepared according to the conventional means are significantly worse than those of the compound A-4 and other embodiments in the present invention. It further shows through the combination with the particle size comparison test that the "the composition is prepared in a known manner, for example, in the presence of an optional surfactant, active matter is diluted or dissolved by a solvent medium and/or a solid diluent to obtain a corresponding formulation" mentioned in the prior art has certain technical defects. Namely, suitable particle size or even good biological activity is achieved by the technical solutions mentioned in the present invention to meet the need that a pesticide product can be applied in the field.

It should be indicated that the data in Table 3 and Table 4 are the bioactivity of indoor pot experiment of the samples, not actual field experiment results. As well known in the technical field, the bioactivity of the compound is evaluated by the method that the compound is dissolved with polar solvent and diluted with a large amount of Tween water, which is equivalent to increasing obviously the use amount of the surfactant. The use amount is much more than the use amount of the surfactant used in the preparation of the formulation, thereby greatly reducing the surface tension of the diluted pesticide liquid formulation of the compound. The biological activity is improved from this perspective, rather than the biological activity of the compound. The compound under the above condition cannot be really applied to the field. On one hand, due to environmental protection requirements, a large amount of polar solvents are not allowed to flow into the field; and on the other hand, due to the current realizable situation, a large number of surfactants cannot be added into the formulation system. Therefore, in the actual field application of the biological activity data in Table 3 and Table 4, the activity of the compound is worse than the activity of the formulation. Namely, the technical effects obtained by the technical solution of the present invention will be more obvious.

An agriculturally applicable formulation prepared by compound A-4 can control the crops beyond the *Tetranychus cinnabarinus* of tetranychidae mentioned in the above embodiments. According to the record of invention patent CN 105541682 A for compound A, it can be inferred that the formulation of the compound has positive control effects on the tetranychidae (*Tetranychus urticae* koch, *Panonychus ulmi* and *Panonychus citri*), eriophyidae and tarsonemidae. It can be reasonably inferred according to several formulations used in biological activity that other formulations prepared by the compound A-4 can also have excellent control effects. According to the biological activity determination method of the above embodiments, the same preparation methods in the embodiments can be used to conduct the biological activity test for other structures A-1, A-2 and A-3 of the compound. The content not described in detail in the description belongs to the prior art known to those skilled in the art.

We claim:

1. A method of controlling insect pests, comprising applying an acaricide liquid formulation to insect pests to be controlled,
    wherein the acaricide liquid formulation comprises: a biphenyl-containing compound of formula A as an active component and liquiritin,
    wherein a mass percentage of liquiritin is 0.01%-1.5%, and
    wherein a mass percentage of the active component in the liquid formulation is 2%-60%,

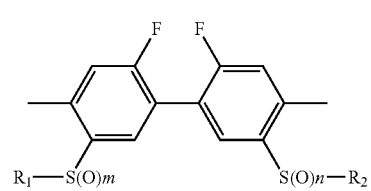

formula A in the formula A, $R_1$ and $R_2$ are independently selected from hydrogen, $C_1$-$C_8$ alkyl, halogenated $C_1$-$C_8$ alkyl, $C_2$-$C_8$ alkenyl, halogenated $C_2$-$C_8$ alkenyl, $C_2$-$C_8$ alkynyl, halogenated $C_2$-$C_8$ alkynyl, cyano $C_1$-$C_8$ alkyl, and cyano halogenated $C_1$-$C_8$ alkyl, and m and n are independently selected from 0, 1, and 2.

2. The method according to claim 1, wherein the acaricide liquid formulation is applied at a dosage of 10-5000 grams of the compound of formula A per hectare.

3. The method according to claim 1, wherein the acaricide liquid formulation is in a form selected from solution, oil, spreading oil, dispersible liquid, emulsion, oil emulsion, emulsifiable concentrate, microemulsion, suspension concentrate, microcapsule suspension concentrate, oil suspension concentrate, and oil-based suspension concentrate.

4. The method according to claim 3, wherein the acaricide liquid formulation is in a form selected from emulsion, suspension concentrate, oil-based suspension concentrate, emulsifiable concentrate, and microemulsion.

5. The method according to claim 4, wherein the emulsion comprises, by mass percentage, 2%-60% of the compound of formula A, 2%-20% of a solvent, 1%-30% of a first wetting dispersant, and 0.01%-1.5% of the liquiritin, and deionized water,
    wherein the suspension concentrate comprises, by mass percentage, 2%-60% of the compound of formula A, 5%-30% of a second wetting dispersant, and 0.01%-1.5% of the liquiritin, and deionized water,
    wherein the oil-based suspension concentrate comprises, by mass percentage, 2%-60% of the compound of formula A, 5%-30% of the first wetting dispersant, and 0.01%-1.5% of the liquiritin, and a dispersion medium oil, and
    wherein the emulsifiable concentrate comprises, by mass percentage, 2%-60% of the compound of formula A, 5%-30% of the first wetting dispersant, and 0.01%-1.5% of liquiritin, and the solvent, and
    wherein the microemulsion comprises, by mass percentage, 2%-60% of the compound of formula A, 2%-15% of the solvent, 1%-30% of the first wetting dispersant, and 0.01%-1.5% of the liquiritin, and deionized water.

6. The method according to claim 5, wherein the first wetting dispersant that is selected from sulfonate, carboxylate, phosphate ester salt, fatty alcohol polyoxyethylene ether, alkylphenol ethoxylate, fatty amine polyoxyethylene ether, fatty acid polyoxyethylene ether, acid alcohol ester and polyoxyethylene ether thereof, alkyl polyglycol ether, alkyl phenyl polyglycol ether, fatty amide and polyoxyethylene ether thereof, alkanolamide and polyoxyethylene ether thereof, block copolymer, sodium alkyl naphthalene sulfonate fatty alcohol polyoxyethylene ether, sorbitan fatty acid ester polyoxyethylene ether, and mixtures thereof.

7. The method according to claim 6, wherein the first wetting dispersant is selected from polyethylene oxide polyvinyl ether, polymer carboxylate, phosphate ester surfactant, and mixtures thereof.

8. The method according to claim 5, wherein the second wetting dispersant is selected from fatty alcohol polyoxyethylene ether, block copolymer surfactant, and mixtures thereof.

* * * * *